US010886852B2

(12) United States Patent
Kolar et al.

(10) Patent No.: US 10,886,852 B2
(45) Date of Patent: Jan. 5, 2021

(54) ELECTRICAL POWER CONVERTER HAVING A DUAL BUCK POWER STAGE AND MAIN SWITCHING STAGE AND METHOD FOR CONTROLLING SUCH AN ELECTRICAL POWER CONVERTER

(71) Applicant: ETEL S.A., Motiers (CH)

(72) Inventors: Johann Walter Kolar, Zurich (CH); Mario Mauerer, Zurich (CH)

(73) Assignee: ETEL S.A., Motiers (CH)

(*) Notice: Subject to any disclaimer, the term of this patent is extended or adjusted under 35 U.S.C. 154(b) by 0 days.

(21) Appl. No.: 16/686,242

(22) Filed: Nov. 18, 2019

(65) Prior Publication Data

US 2020/0161979 A1 May 21, 2020

(30) Foreign Application Priority Data

Nov. 21, 2018 (EP) ...................................... 18207576

(51) Int. Cl.
*H02M 3/158* (2006.01)
*H02M 3/156* (2006.01)

(52) U.S. Cl.
CPC .......... *H02M 3/1588* (2013.01); *H02M 3/156* (2013.01); *H02M 3/158* (2013.01); *H02M 3/1584* (2013.01)

(58) Field of Classification Search
CPC .. H02M 3/1588; H02M 3/158; H02M 3/1584; H02M 3/156
See application file for complete search history.

(56) References Cited

U.S. PATENT DOCUMENTS

| 6,144,567 A | * | 11/2000 | Asplund | ................... H02J 3/36 363/34 |
|---|---|---|---|---|
| 7,233,132 B1 | | 6/2007 | Dong et al. | |
| 2007/0211507 A1 | | 9/2007 | Ilic | |
| 2007/0279022 A1 | | 12/2007 | Chen et al. | |

(Continued)

OTHER PUBLICATIONS

Johannes Maria Schellekens, "A class of robust switched-mode power amplifiers with highly linear transfer characteristics," PhD Dissertation, University of Eindhoven, Dec. 2014, pp. 1-344.

(Continued)

*Primary Examiner* — Matthew V Nguyen
*Assistant Examiner* — Lakaisha Jackson
(74) *Attorney, Agent, or Firm* — Leydig, Voit & Mayer Ltd.

(57) ABSTRACT

An electrical power converter includes a dual buck power stage with a first half bridge and second half bridge. Each of the half bridges is arranged between a first common node and a second common node. Each of the half bridges comprises an upper switching element and a lower switching element. The upper switching element is configured to switch a current between the first common node and a respective first or second bridge midpoint. The lower switching element is configured to switch a current between the respective first or second bridge midpoint and the second common node. The first and second bridge midpoints are connected to a summing node via respective first and second dual buck inductors. A main switching stage is arranged to supply, through a main stage inductor and through a main output line, a main stage current to the summing node.

20 Claims, 3 Drawing Sheets

(56) References Cited

U.S. PATENT DOCUMENTS

2015/0085550 A1* 3/2015 Mueller ............... H02M 7/538
                                                        363/132
2016/0329811 A1* 11/2016 Du ......................... H02M 1/14
2017/0012452 A1* 1/2017 Kang ....................... H02J 7/00
2017/0227937 A1* 8/2017 Batliner ............... G05B 13/048

OTHER PUBLICATIONS

Johannes Maria Schellekens, "High Precision Switched Mode Amplifier with an Auxiliary Bias Circuit," Proc. Of the European Conference on Power Electronics and Applications (EPE), Dec. 2013, pages.

* cited by examiner

ELECTRICAL POWER CONVERTER HAVING A DUAL BUCK POWER STAGE AND MAIN SWITCHING STAGE AND METHOD FOR CONTROLLING SUCH AN ELECTRICAL POWER CONVERTER

CROSS-REFERENCE TO PRIOR APPLICATION

Priority is claimed to European Patent Application No. EP 18 207 576.2, filed on Nov. 21, 2018, the entire disclosure of which is hereby incorporated by reference herein.

FIELD

The invention relates to the field of converters for electrical power, in particular to an electrical power converter and method for controlling an electronic power converter.

SUMMARY

In an embodiment, the present invention provides an electrical power converter including a dual buck power stage with a first half bridge and second half bridge. Each of the first and the second half bridges is arranged between a first common node and a second common node. Each of the first and the second half bridges comprises an upper switching element and a lower switching element. The upper switching element is configured to switch a current between the first common node and a respective first or second bridge midpoint. The lower switching element is configured to switch a current between the respective first or second bridge midpoint and the second common node. The first and second bridge midpoints are connected to a summing node via respective first and second dual buck inductors. The electrical power converted further includes a main switching stage is arranged to supply, through a main stage inductor and through a main output line, a main stage current to the summing node.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. In principle, identical or functionally identical parts are provided with the same reference symbols in the figures. The features and advantages of various embodiments of the present invention will become apparent by reading the following detailed description with reference to the attached drawings which illustrate the following.

DETAILED DESCRIPTION

Figure 1:
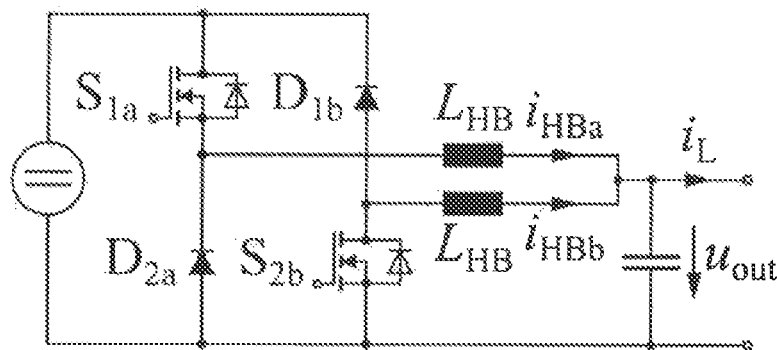
FIG. 1 Regular dual buck topology. No dead time intervals are required. A circulating bias current reduces the load current dependency of the half-bridge output voltages, which reduces distortion.

A dual buck (DB) power stage topology, illustrated in FIG. 1, is used in precision, switch-mode power amplifiers. Its goal is to provide a low-distortion output voltage $u_{out}$ or output current (or load current) $i_L$. The DB topology is often utilized for such applications, as it is capable of attenuating certain distortion components in the output voltage or current that are inherent to other power stage arrangements. The topology is also known as the opposed current converter or the balanced current amplifier (see J. M. Schellekens, "A Class of Robust Switched-Mode Power Amplifiers with Highly Linear Transfer Characteristics," PhD Dissertation, University of Eindhoven, 2014, ISBN: 978-94-6259-400-5, DOI: 10.6100/IR783105). The relevant distortion components which the DB topology can attenuate are, in a regular interleaved half-bridge (HB) power conversion stage, caused by half-bridge interlock time or dead time. This is the time interval during complementary transistor switching actions where both half-bridge transistors are turned off in order to prevent a DC-link short-circuit. Ordinarily, this leads to a current-dependent output voltage of the half bridge. As this process is of a nonlinear nature, harmonic distortion is introduced, which is undesired for certain applications, e.g., audio amplification or precision motor drives.

Figure 2:
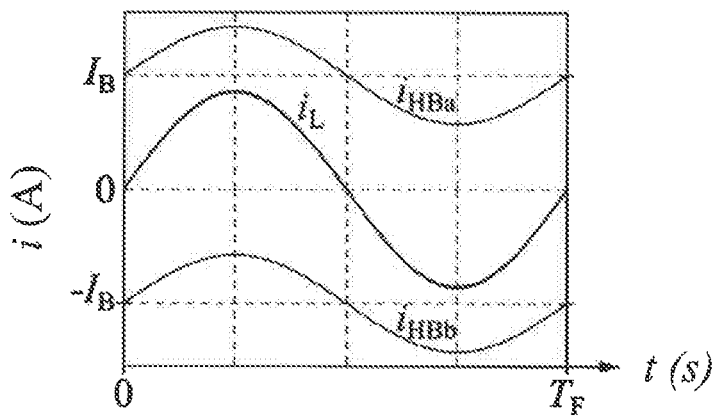
FIG. 2 Dual buck half-bridge current waveforms. The half-bridge currents are unidirectional and dominated by the circulating bias current $I_B$.

The DB topology, which comprises two half-bridges (cf. FIG. 1) does not require any dead time and thus, the introduction of this key source of distortion is avoided. Furthermore, a key characteristic is a circulating bias current flowing between the two half-bridges ($I_B$, as illustrated in FIG. 2), which also renders the switching behaviour of the power semiconductors less modulated by the load current $i_L$. This further reduces distortion.

The bias current must be selected to be sufficiently high such that for all expected load currents $i_L$, the unidirectionality of the half-bridge currents is maintained in order to prevent distortion. Note that the bias current must not necessarily be constant. In order to reduce losses, it can be modulated and adapted for different expected load current amplitudes (see J. M. Schellekens, "A Class of Robust Switched-Mode Power Amplifiers with Highly Linear Transfer Characteristics," PhD Dissertation, University of Eindhoven, 2014, ISBN: 978-94-6259-400-5, DOI: 10.6100/IR783105). This, however, increases the harmonic distortion of the output waveforms.

The dual buck topology is immune against faulty power transistor switching actions, as a short-circuit of the DC-link is not possible during regular operation (i.e., both power transistors can be turned on simultaneously, without causing a short-circuit).

Figure 3:
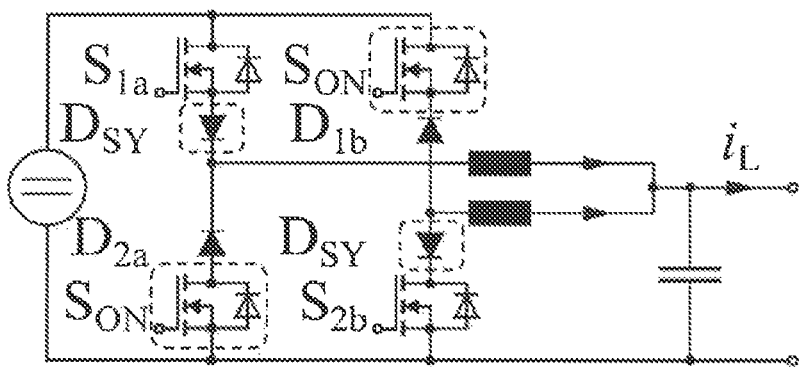
FIG. 3 Symmetrical dual buck topology. Additional diodes and transistors are connected in series to the main switches in order to render the voltage drops of each switching leg more uniform.

Different dual buck topology variants exist. FIG. 3 illustrates a symmetrized DB power stage, where additional diodes and power switches (marked by dashed boxes) are connected in series to the main power transistors in order to render the voltage drops of each half-bridge leg identical. This is done to potentially further reduce distortion.

Figure 4:
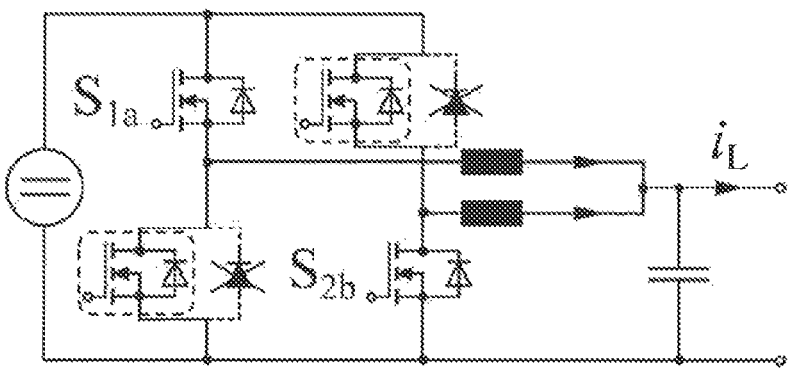
FIG. 4 Synchronously rectified dual buck topology. The main power diodes are replaced with synchronously rectifying power transistors.

FIG. 4 illustrates a dual buck variant where the main power diodes are replaced by power transistors (marked by dashed boxes) that provide synchronous rectification (i.e., they act complementary to the dual buck transistors $S_{1a}$ and $S_{2b}$). This reduces losses and renders the legs symmetrical, but it is now possible to short-circuit the DC link by turning on two half-bridge transistors simultaneously.

Figure 5:
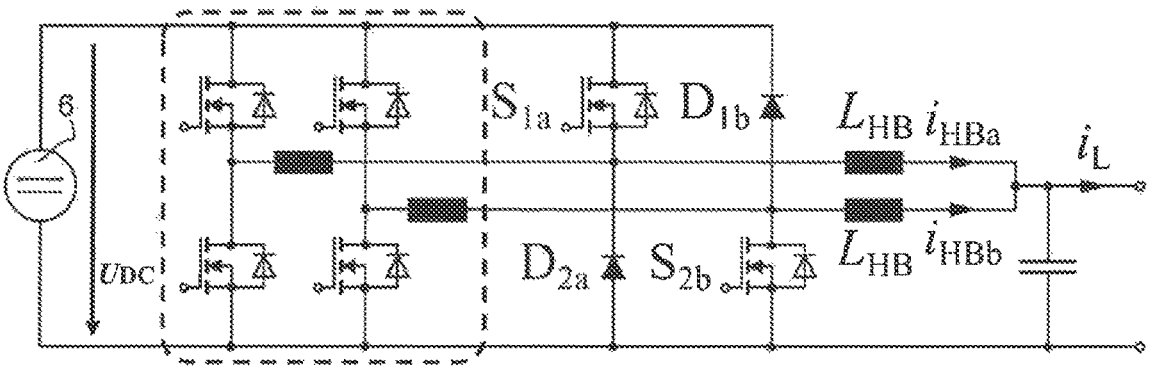
FIG. 5 Auxiliary bias dual buck topology. The bias power stage is used to provide the bias current of the dual buck converter.

FIG. 5 illustrates the dual buck topology, extended by an auxiliary bias circuit (marked by a dashed box). The additional half-bridges (which can also be implemented as dual buck converters, but are drawn in FIG. 5 as regular half-bridge switching legs) are used to provide the circulating bias current to the main dual buck power stage (see J. M. Schellekens, M. L. A. Caris, J. L. Duarte, H. Huisman, M. A. M. Hendrix and E. Lomonova, "*High Precision Switched Mode Amplifier with an Auxiliary Bias Circuit*", in Proc. of the *European Conference on Power Electronics and Applications* (*EPE*), 2013, pp. 1-10. DOI: 10.1109/EPE.2013.6631964).

Embodiments of the invention provide an electrical power converter and method for controlling an electronic power converter, comprising a dual buck topology, which overcomes the disadvantages mentioned above.

The electrical power converter comprises a dual buck power stage with a first half bridge and second half bridge. Each half bridge is arranged between a first common node and a second common node, and comprises:

an upper switching element for switching a current between the first common node and a respective first or second bridge midpoint, and a lower switching element for switching a current between the respective first or second bridge midpoint and the second common node.

The first and second bridge midpoint are connected to a summing node via respective first and second dual buck inductors and, and the converter further comprises a main switching stage arranged to supply, through a main stage inductor and through a main output line, a main stage current to the summing node.

In this manner, a topology is implemented that is referred to herein as "triple buck". Its key characteristics are low-distortion outputs, with considerably reduced power conversion losses as compared to the dual buck topologies.

The switching elements can be active switches, wherein a state of the switch is controlled by a control terminal. The switches can be passive switches, such as diodes.

In embodiments, the main output line connects the summing node, via the main stage inductor, to a bridge midpoint of a half bridge of the main switching stage.

In embodiments, the first and second dual buck inductors and are magnetically coupled to suppress differential mode currents, in particular with a coupling factor being at least 0.4 or at least 0.5 or at least 0.6 or at least 0.8.

In other words, the first and second dual buck inductors form a differential mode choke regarding currents flowing through them into the summing node. Preferably, they ideally do not affect common mode currents into the summing node. Typically, the inductances of the two dual buck inductors have the same value.

In embodiments, the electrical power converter comprises an output inductor connected between the summing node and an output node, and at least one output capacitance connected between the output node and one of the common nodes. For example, the inductance of the output inductor can be in the range between one tenth and ten times the inductance of the main stage inductor, in particular between one fifth and five times the inductance of the main stage inductor, and in particular approximately equal to the inductance of the main stage inductor.

In embodiments, the common nodes constitute input terminals or first side terminals of the converter. In embodiments, the output node constitutes an output terminal or second side terminal of the converter. The converter serves to transfer electrical power from the first side to the second side or vice versa. An output voltage can be defined as the voltage between the output node and the first or the second common node In embodiments, the inductances of the dual buck inductors are in the range between one tenth and ten times the inductance of the main stage inductor, in particular between one fifth and five times the inductance of the main stage inductor, and in particular approximately equal to the inductance of the main stage inductor.

In embodiments, in the dual buck power stage:
in the first half bridge the upper switching element is an upper switch $S_{1a}$, and the lower switching element is a lower diode $D_{2a}$,
in the second half bridge the upper switching element is an upper diode $D_{1b}$, and the lower switching element is a lower switch $S_{2b}$.

Thus, in this embodiment, the dual buck power stage has a regular dual buck topology.

In embodiments, in each branch of each of the half bridges, a series arrangement of a switch and a diode is present. Thus, in such embodiments, the dual buck power stage has a symmetrical dual buck topology.

In embodiments, in each branch of each of the half bridges, a switch is present, in particular without a diode in a series connection with the switch. Thus, in such embodiments, the dual buck power stage has a synchronously rectified dual buck topology.

For embodiments in which diodes are present, then typically in the first half bridge they are oriented to allow for a current flow into the first bridge midpoint but not out of the first bridge midpoint, and in the second half bridge they are oriented to allow for a current flow out of the second bridge midpoint but not into the second bridge midpoint.

In embodiments, the main switching stage comprises at least one half bridge, the half bridge being arranged between the first common node and the second common node, and comprising:

an upper switching element for switching a current between the first common node and a bridge midpoint, a lower switching element for switching a current between the respective second bridge midpoint and the second common node (n), the bridge midpoint being connected to the summing node via the main stage inductor.

In embodiments, the main switching stage comprises further half bridges. In embodiments, the half bridges can be configured to connect the respective bridge midpoints to one of two, three or more common nodes at different voltage levels.

In embodiments, switching elements of the dual buck power stage have a maximum switching frequency that is at least five or at least ten or at least fifty times higher than that of switching elements of the main switching stage.

The dual buck power stage can correct residual errors in the output of the main switching stage. Such residual errors can be reflected by errors in the output current and/or output voltage. A controller can measure one or more of such errors and control the dual buck power stage to correct them. With the switching frequency of the dual buck power stage being higher than that of the main switching stage, the correction can improve the dynamic behaviour of the combined system over that of the main stage alone. However, in embodiments, the switching frequency of the dual buck power stage can be the same or lower than that of the main switching stage.

In embodiments, the electrical power converter comprises a controller, wherein the controller is configured to:

control the main switching stage to provide the main stage current as a main component of a load current, and control the dual buck power stage to provide a common mode current as a remaining component of the load current, wherein preferably the amplitude of the main stage current is at least two or five or ten times larger than the amplitude of the common mode current.

This allows to provide the main current or power component by the main switching stage, at relatively low switching frequencies, and corrective currents with relatively low power but a high bandwidth by the dual buck power stage, with relatively high switching frequencies. The overall effect can be to reduce losses.

In embodiments, the controller is configured to control the dual buck power stage to carry a differential mode current or bias current circulating through the first and second dual buck inductors and.

This allows to control the bias current to have a given amplitude and thereby ensure that the half-bridge currents of the dual buck power stage do not change their direction. In other words, the half-bridge currents remain unidirectional, which leads to a reduced modulation of the half-bridge output voltages.

In embodiments, the controller is configured to comprise a main stage controller section controlling the main stage current delivered by the main switching stage, in particular given an output voltage set point.

This allows to control the main component of the power delivered by the converter, with the relatively low switching frequency, based on the current fed into the summing node by the main switching stage.

In embodiments, the controller is configured to comprise a dual buck stage controller section controlling the currents delivered by the two half-bridges of the dual buck stage, given a set point for the bias current.

This allows to control the dual buck power stage separately from the main switching stage, in particular the bias current, which is a function of the currents delivered by the two half bridges.

In embodiments, the controller is configured to comprise a feedforward controller section, which generates a feedforward control signal and feeds it into the dual buck stage controller section, in particular wherein the feedforward control signal is generated from an output voltage error.

This allows to react quicker to changes in the output voltage, or its error, and to adapt the currents delivered by the two half-bridges accordingly.

In embodiments, the controller is configured to adjust, based on a power distribution control value, operation of the converter such that the main switching stage and the dual buck power stage each provides a given fraction of the current through the output inductor, and in particular such that either the main switching stage or the dual buck power stage provides the entire current through the output inductor.

The power converter thereby is able to adjust the distribution of the power load being transferred by the converter between the dual buck power stage and the main switching stage. Thereby, operation can be adapted to varying requirements. For example, if during a phase of the operation, high power is required, a large part or all of the power can be converted by the main switching stage. This usually is acceptable since in high power phases the requirements on the quality of the current and/voltage signals usually are lower. That is, a higher distortion is acceptable. Conversely, if the quality requirements are high, the fraction of the power handled by the dual buck power stage is increased.

A method for controlling the electrical power converter according to an embodiment comprises:

controlling the main switching stage to provide the main stage current as a main component of a load current, and controlling the dual buck power stage to provide a common mode current as a remaining component of the load current, wherein preferably the amplitude of the main stage current is at least two or five or ten times larger than the amplitude of the common mode current.

Figure 6:
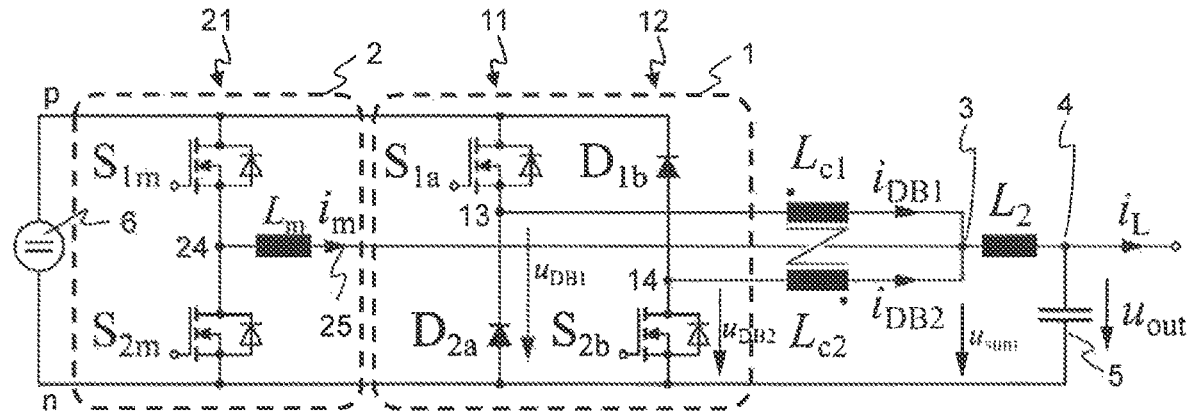
FIG. 6 Triple buck topology. The dual buck stage can dynamically correct the output signal errors of the main switching stage, which provides the bulk load current or output current at a high efficiency.

A triple buck topology is illustrated in FIG. 6. It comprises two key parts. A dual buck power stage 1 and a main conversion or switching stage 2. Both are connected between a first common node p and a second common node n. Typically, these common nodes are configured to be connected to a voltage source 6, in particular a DC voltage source, with a DC Voltage $U_{DC}$.

The dual buck operates as a regular dual buck converter, as presented in the previous section (i.e., there is a circulating bias current between the two dual buck half-bridge legs). However, a considerable amount of load current is provided by the main conversion or switching stage 2 instead of the dual buck converter. This main switching stage 2 can be of any topology, whereas the figure shows, as an exemplary embodiment, a half-bridge topology. The dual buck stage is only used to correct residual errors of the main conversion stage's output waveforms (which are, e.g., distortion components caused by half-bridge dead time).

The half-bridge topology shown comprises a half bridge 21, comprising an upper switch $S_{1m}$ for switching a current between the first common node p and a bridge midpoint 24, and a lower switch $S_{2m}$ for switching a current between the bridge midpoint 24 and the second common node n. The bridge midpoint, via a main stage inductor $L_m$, is connected to a main output line 25 carrying a main stage current $i_m$.

The dual buck power stage 1 comprises a first half bridge 11 and a second half bridge 12. Each of the half bridges 11, 12 comprises an upper switching element for switching a current between the first common node p and a respective first or second bridge midpoint 13, 14, and a lower switching element for switching a current between the respective bridge midpoint 24 and the second common node n. In the embodiment of FIG. 6, the upper switching elements are an upper switch $S_{1a}$ of the first half bridge 11 and an upper diode $D_{1b}$ of the second half bridge 12, and the lower switching elements are a lower diode $D_{2a}$ of the first half bridge 11 and a lower switch $S_{2b}$ of the second half bridge 12.

The first and second bridge midpoint 13, 14 are connected to a summing node 3 via respective first and second dual buck inductors $L_{c1}$ and $L_{c2}$. The summing node is connected to an output node 4 via an output inductor $L_2$. The output node 4 is connected to one or both of the common nodes via one or more output capacitances 5.

In order to increase the output voltage dynamics of the dual buck stage, the dual buck inductors $L_{c1}$, $L_{c2}$ can be strongly (magnetically) coupled. The coupling is such that—ideally—only differential mode currents in the dual buck inductors $L_{c1}$, $L_{c2}$ are affected by the inductors, and common mode currents are not affected. This creates a differential-mode (DM) inductor for the DM output voltage ($u_{DB1}$-$u_{DB2}$) of the DB stage. The DM voltage is used to control the circulating bias current of the DB stage. On the other hand, for the common-mode (CM) output voltage component of the dual buck stage $u_{sum}=((u_{DB1}+u_{DB2})/2)$, the coupled inductor provides only a negligible impedance (caused by the generally non-ideal magnetic coupling and the resulting stray inductances). Thus, the voltage $u_{sum}$ can be controlled with high dynamics by the dual buck stage, and can thereby be used to correct the output signal errors of the main switching stage. As the dual buck topology still operates with a circulating bias current and unidirectional half-bridge currents, its output signal quality is maintained.

The two dual buck inductors $L_{c1}$ and $L_{c2}$ must not necessarily be strongly magnetically coupled, but a strong coupling minimizes the CM inductance and increases obtainable dynamics. Furthermore, loosely coupled inductors are expected to suffer from increased winding and core losses. In particular, the coupling factor can be at least 0.4 or at least 0.5 or at least 0.6 or at least 0.8. Ideal coupling is represented by the coupling factor having a value of one.

As the main switching stage provides a significant proportion of the load current $i_L$, the bias current of the dual buck stage can be reduced, as this stage only provides corrective output signals. This reduces the losses of the dual buck conversion stage, which are otherwise significant.

The output inductor $L_2$ decouples the output filter capacitor from the summing node 3. The summing node 3 has a low impedance connection to the dual buck stage's output voltages due to the DM nature of the coupled inductor.

Figure 7:
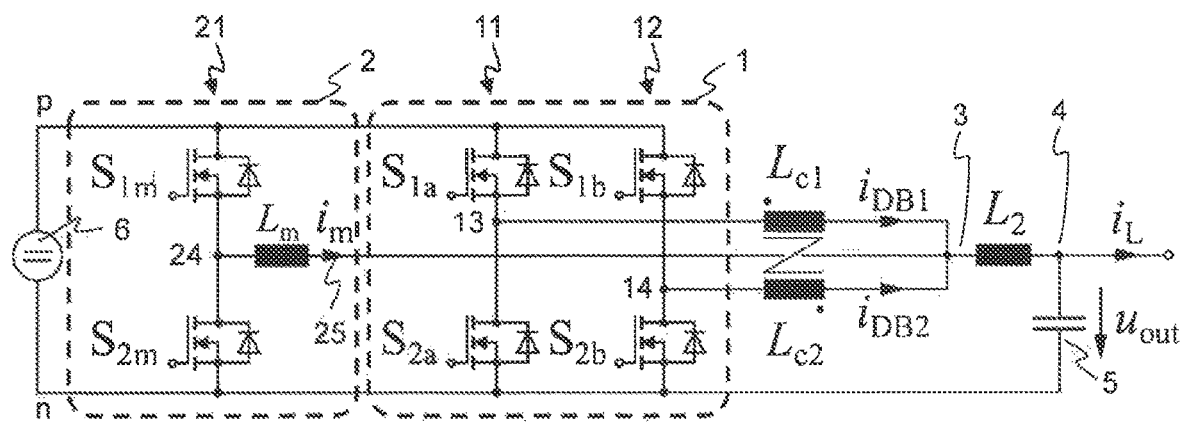
FIG. 7 Synchronously rectified triple buck topology.

FIG. 7 illustrates a synchronously rectified circuit variant of the triple buck converter. The main power diodes of the dual buck stage are replaced by complementarily acting power transistors in order to reduce losses (cf. FIG. 4). As a result, the upper switching elements are an upper switch $S_{1a}$ of the first half bridge 11 and an upper switch $S_{1b}$ of the second half bridge 12, and the lower switching elements are a lower switch $S_{2a}$ of the first half bridge 11 and a lower switch $S_{2b}$ of the second half bridge 12. The current waveforms and key operating principles remain identical as with the topology shown in FIG. 6.

Figure 8:
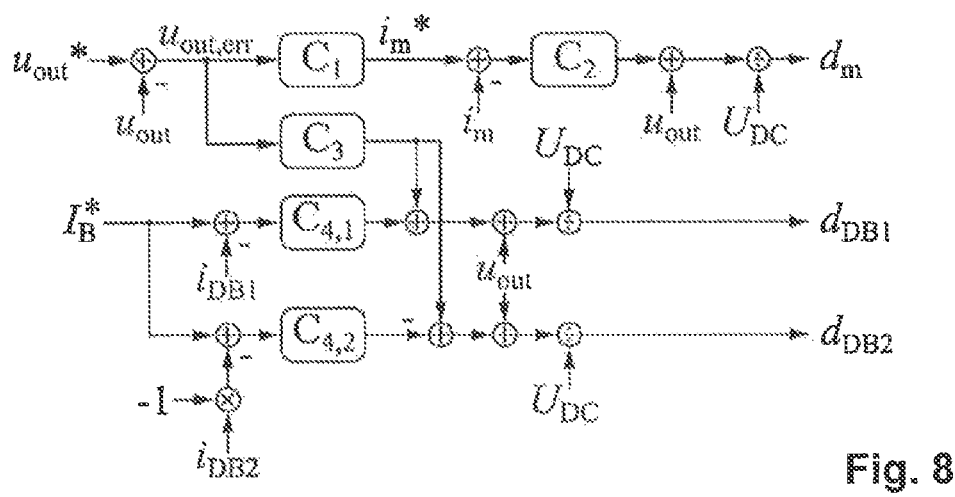
FIG. 8 Triple buck control system structure. Cascaded controllers/compensators are used to provide output voltage tracking and disturbance rejection.

FIG. 8 illustrates a possible control system structure for the triple buck converter that can be employed to provide a controlled output voltage $u_{out}$. Note that quantities with an asterisk (*) are reference signals for the respective controllers. It is assumed that each of the three switching legs of the triple buck converter is controlled by a pulse-width modulator. The outputs of the control topology are the three corresponding duty cycles (the duty cycle is the relative turn-on time of the high-side half-bridge power transistor within a switching interval), whereas $d_m$ is the duty cycle of the main power stage and $d_{DB1}$ and $d_{DB2}$ are the duty cycles of the two switching legs of the dual buck stage.

A first controller (or compensator) $C_1$ is used to control the output voltage $u_{out}$. Its input is an output voltage error $u_{out,err}$, that is, the difference between the output voltage $u_{out}$ and an output voltage set point $u_{out}$*. Its output signal is a current reference $i_m$*for a second, underlying current controller $C_2$ of the main switching stage ($i_m$).

The input of the second controller $C_2$ is the difference between this current reference $i_m$* and the actual (measured or estimated) current $i_m$ of the main switching stage. The actual output voltage $u_{out}$ is added to the output of the second controller $C_2$. The resulting sum divided by the DC Voltage $U_{DC}$ determines the duty cycle $d_m$ of the main power stage 2.

The DC Voltage $U_{DC}$ can be measured or estimated, or assumed to have a constant, known value.

A third controller $C_3$, having as input the output voltage error $u_{out,err}$, controls the CM output voltage of the dual buck stage. This voltage is used to attenuate the remaining output voltage error ($u_{out,err}$).

A fourth and fifth controller $C_{4,1}$ and $C_{4,2}$ are used to control the circulating bias current of the dual buck stage (through the DM output voltage $u_{DB1}$-$u_{DB2}$ of the dual buck stage, cf. FIG. 6).

For the fourth controller $C_{4,1}$, the set point for the bias current $I_B$* is reduced by the (measured or estimated) current of $i_{DB1}$ of the first half bridge 11. This is the current flowing from the first bridge midpoint 13 to the summing node 3.

The output of the fourth controller $C_{4,1}$ is added to the output of the third controller $C_3$. The actual output voltage $u_{out}$ is added to the resulting sum. The resulting sum divided by the DC Voltage $U_{DC}$ determines the duty cycle $d_{DB1}$ of the first half bridge 11 of the dual buck power stage 1.

For the fifth controller $C_{4,2}$, the set point for the bias current $I_B$* is reduced by the (measured or estimated) current of $i_{DB2}$ of the second half bridge 12, with reversed polarity. $i_{DB2}$ is the current flowing from the second bridge midpoint 14 to the summing node 3.

The output of the fifth controller $C_{4,2}$ is added to the output of the third controller $C_3$. The actual output voltage $u_{out}$ is added to the resulting sum. The resulting sum divided by the DC Voltage $U_{DC}$ determines the duty cycle $d_{DB2}$ of the second half bridge 12 of the dual buck power stage 1.

In summary, the control system takes as input the desired output voltage set point $u_{out}$*, the desired bias current $I_B$*, measured or estimated voltages and currents, and determines duty cycles of the dual buck power stage 1 and the main power stage 2, or, more generally, the averages of the switched voltages at the midpoints of the dual buck power stage 1 and at the output of the main power stage 2. These voltages drive the currents through the dual buck inductors $L_{c1}$, $L_{c2}$ and the main stage inductor $L_m$, and thereby control these currents to correspond to the desired values determined in the controller, and thereby also control the current through the output inductor $L_2$ and the output voltage over output capacitances 5.

More generally a main stage controller section $C_1$, $C_2$ controls the current $i_m$ delivered by the main switching stage 2, in particular given the output voltage set point $u_{out}$*, and a dual buck stage controller section $C_{4,1}$, $C_{4,2}$ controls the currents delivered by the two half-bridges of the dual buck stage, given the set point for the bias current $I_B$*.

Optionally, the dual buck stage controller section can use the output voltage set point $u_{out}$* or the output voltage error $u_{out,err}$, in a feedforward controller section $C_3$.

The gain of the feedforward controller section $C_3$ can be used to adjust the fraction or the relative contribution of power converted by the main switching stage 2 and the dual buck power stage 1. The larger the gain is, the more the fraction converted by the dual buck power stage 1 becomes. The fraction converted by the main switching stage 2 is automatically reduced by the interaction of the controllers.

The dual buck power stage 1 (with duty cycle $d_m$) typically can have a maximum switching frequency that is at least five or at least ten or at least fifty times higher than that of the main switching stage 2 (with duty cycles $d_{DB1}$ and $d_{DB2}$).

The compensators/controllers can be of any type, e.g., proportional (P) or proportional-integral (PI), etc.

Figure 9:
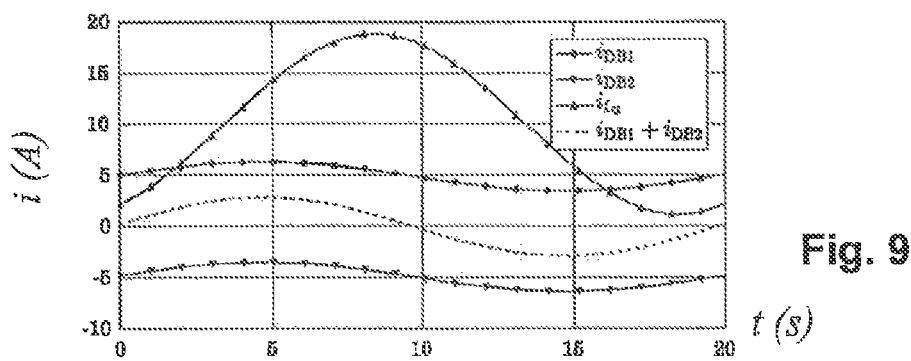
FIG. 9 Current waveforms of the triple buck topology. The bias current can be significantly reduced, which increases the overall conversion efficiency.
Figure 10:
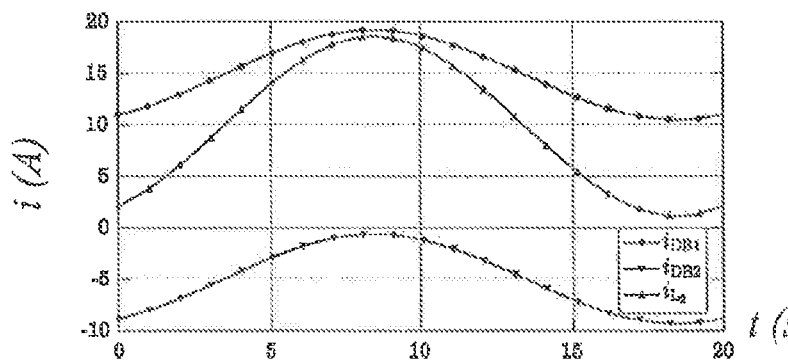
FIG. 10 Current waveforms of the regular dual buck topology, providing an identical output voltage as the waveforms in FIG. 9. However, the half-bridge currents are considerably increased.

Computer circuit simulations were performed to verify the functionality of the topology and the control approach. FIG. 9 illustrates key waveforms. It is evident that the load current contribution from the dual buck conversion stage ($i_{DB1}+i_{DB2}$) is considerably smaller than what the main switching stage provides (compare with $i_{L2}$). Thus, the bias current can be set to a comparably low value (5A in this example). FIG. 10 illustrates corresponding waveforms of a regular dual buck topology, for the same operating conditions as in FIG. 9. Here, the dual buck stage has to provide the full load current. Hence, its bias current must be increased to 15A as illustrated, in order to maintain the unidirectionality of the halfbridge currents. This increases losses.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electrical power converter, comprising:
   a dual buck power stage with a first half bridge and second half bridge, each of the first and the second half bridges being arranged between a first common node and a second common node, each of the first and the second half bridges comprising an upper switching element and a lower switching element, the upper switching element being configured to switch a current between the first common node and a respective first or second bridge midpoint, and the lower switching element being configured to switch a current between the respective first or second bridge midpoint and the second common node, the first and second bridge midpoints being connected to a summing node via respective first and second dual buck inductors; and
   a main switching stage arranged to supply, through a main stage inductor and through a main output line, a main stage current to the summing node,
   wherein switching elements of the dual buck power stage have a maximum switching frequency that is at least five times higher than that of switching elements of the main switching stage.

2. The electrical power converter of claim 1, wherein the first and second dual buck inductors are magnetically coupled to suppress differential mode currents with a coupling factor of at least 0.4.

3. The electrical power converter of claim 1, further comprising:
   an output inductor connected between the summing node and an output node; and
   at least one output capacitance connected between the output node and one of the common nodes.

4. The electrical power converter of claim 3, wherein the inductance of the output inductor is in a range between one tenth and ten times the inductance of the main stage inductor.

5. The electrical power converter of claim 1, wherein the upper switching element in the first half bridge is an upper switch and the lower switching element in the first half bridge is a lower diode, and wherein the upper switching element in the second half bridge is an upper diode and the lower switching element in the second half bridge is a lower switch.

6. The electrical power converter of claim 1, wherein each branch of each of the first and second half bridges includes a series arrangement of a switch and a diode.

7. The electrical power converter of claim 1, wherein each branch of each of the first and second half bridges includes a switch.

8. The electrical power converter of claim 7, wherein each branch of each of the first and second half bridges does not include a diode in a series connection with the switch.

9. The electrical power converter of claim 1, wherein the main switching stage comprises at least one half bridge arranged between the first common node and the second common node, the at least one half bridge comprising an upper switching element and a lower switching element, the upper switching element being configured to switch a current between the first common node and a bridge midpoint of the at least one half bridge, the lower switching element being configured to switch a current between the bridge midpoint of the at least one half bridge and the second common node, the bridge midpoint of the at least one half bridge being connected to the summing node via the main stage inductor.

10. The electrical power converter of claim 1, further comprising a controller configured to:
    control the main switching stage to provide the main stage current as a main component of a load current, and
    control the dual buck power stage to provide a common mode current as a remaining component of the load current.

11. The electrical power converter of claim 10, wherein the amplitude of the main stage current is at least two times larger than the amplitude of the common mode current.

12. The electrical power converter of claim 10, wherein the controller includes a main stage controller section configured to control the main stage current delivered by the main switching stage, given an output voltage set point.

13. The electrical power converter of claim 10, wherein the controller is configured to adjust, based on a power distribution control value, operation of the converter such that the main switching stage and the dual buck power stage each provides a given fraction of the current through the output inductor.

14. The electrical power converted of claim 10, wherein the controller is configured to adjust, based on a power distribution control value, operation of the converter such that either the main switching stage or the dual buck power stage provides the entire current through the output inductor.

15. The electrical power converter of claim 10, wherein the controller is configured to control the dual buck power stage to carry a differential mode current or bias current circulating through the first and second dual buck inductors ($L_{c1}$) and ($L_{c2}$).

16. The electrical power converter of claim 15, wherein the controller includes a dual buck stage controller section configured to control the currents delivered by the first and second half-bridges of the dual buck stage, given a set point for the bias current.

17. The electrical power converter of claim 16, wherein the controller is includes a feedforward controller section configured to generate a feedforward control signal and feed the feedforward control signal into the dual buck stage controller section.

18. The electrical power converter of claim 17, wherein the feedforward control signal is generated from an output voltage error.

19. A method for controlling an electrical power converter, the method comprising:
providing the electrical power converter comprising:
a dual buck power stage with a first half bridge and second half bridge, each of the first and the second half bridges being arranged between a first common node and a second common node, each of the first and the second half bridges comprising an upper switching element and a lower switching element, the upper switching element being configured to switch a current between the first common node and a respective first or second bridge midpoint, and the lower switching element being configured to switch a current between the respective first or second bridge midpoint and the second common node, the first and second bridge midpoints being connected to a summing node via respective first and second dual buck inductors, and
a main switching stage arranged to supply, through a main stage inductor and through a main output line, a main stage current to the summing node;
controlling the main switching stage to provide the main stage current as a main component of a load current; and
controlling the dual buck power stage to provide a common mode current as a remaining component of the load current.

20. An electrical power converter, comprising:
a dual buck power stage with a first half bridge and second half bridge, each of the first and the second half bridges being arranged between a first common node and a second common node, each of the first and the second half bridges comprising an upper switching element and a lower switching element, the upper switching element being configured to switch a current between the first common node and a respective first or second bridge midpoint, and the lower switching element being configured to switch a current between the respective first or second bridge midpoint and the second common node, the first and second bridge midpoints being connected to a summing node via respective first and second dual buck inductors;
a main switching stage arranged to supply, through a main stage inductor and through a main output line, a main stage current to the summing node; and
a controller configured to:
control the main switching stage to provide the main stage current as a main component of a load current, and
control the dual buck power stage to provide a common mode current as a remaining component of the load current.

* * * * *